(12) United States Patent
Kinpara et al.

(10) Patent No.: US 10,164,244 B2
(45) Date of Patent: Dec. 25, 2018

(54) NEGATIVE-ELECTRODE MIXTURE FOR NON-AQUEOUS ELECTROLYTE SECONDARY CELL, NEGATIVE ELECTRODE FOR NON-AQUEOUS ELECTROLYTE SECONDARY CELL CONTAINING SAID MIXTURE, NON-AQUEOUS ELECTROLYTE SECONDARY CELL PROVIDED WITH SAID NEGATIVE ELECTRODE, AND ELECTRICAL DEVICE

(71) Applicants: Sumitomo Seika Chemicals Co., Ltd., Hyogo (JP); National Institute of Advanced Industrial Science and Technology, Tokyo (JP)

(72) Inventors: Yuji Kinpara, Hyogo (JP); Junichi Fujishige, Hyogo (JP); Nobutaka Fujimoto, Hyogo (JP); Takashi Mukai, Osaka (JP); Masanori Morishita, Osaka (JP); Tetsuo Sakai, Osaka (JP)

(73) Assignees: National Institute of Advanced Industrial Science and Technology, Tokyo (JP); Sumitomo Seika Chemicals Co., Ltd., Hyogo (JP)

( * ) Notice: Subject to any disclaimer, the term of this patent is extended or adjusted under 35 U.S.C. 154(b) by 54 days.

(21) Appl. No.: 14/901,331

(22) PCT Filed: Mar. 19, 2014

(86) PCT No.: PCT/JP2014/001586
§ 371 (c)(1),
(2) Date: Dec. 28, 2015

(87) PCT Pub. No.: WO2014/207967
PCT Pub. Date: Dec. 31, 2014

(65) Prior Publication Data
US 2016/0156024 A1    Jun. 2, 2016

(30) Foreign Application Priority Data
Jun. 28, 2013 (JP) ................. 2013-136116

(51) Int. Cl.
*H01M 4/62* (2006.01)
*H01M 4/36* (2006.01)
*H01M 4/133* (2010.01)
*H01M 4/134* (2010.01)
*H01M 4/38* (2006.01)
*H01M 4/587* (2010.01)
*H01M 10/052* (2010.01)
*H01M 4/58* (2010.01)
*H01M 4/02* (2006.01)

(52) U.S. Cl.
CPC .......... *H01M 4/364* (2013.01); *H01M 4/133* (2013.01); *H01M 4/134* (2013.01); *H01M 4/386* (2013.01); *H01M 4/58* (2013.01); *H01M 4/587* (2013.01); *H01M 4/622* (2013.01); *H01M 4/625* (2013.01); *H01M 10/052* (2013.01); *H01M 2004/027* (2013.01)

(58) Field of Classification Search
CPC ............ H01M 4/02; H01M 4/04; H01M 4/62; H01M 4/621; H01M 4/622
See application file for complete search history.

(56) References Cited

U.S. PATENT DOCUMENTS

| | | | |
|---|---|---|---|
| 5,153,082 A | 10/1992 | Ogino et al. | |
| 5,525,444 A | 6/1996 | Ito et al. | |
| 2007/0190413 A1* | 8/2007 | Lee ................ | H01M 4/386 429/218.1 |
| 2012/0070737 A1 | 3/2012 | Son et al. | |
| 2014/0045054 A1 | 2/2014 | Komaba et al. | |
| 2015/0099156 A1 | 4/2015 | Suzuki et al. | |
| 2015/0125697 A1 | 5/2015 | Yamasaki et al. | |
| 2015/0280237 A1 | 10/2015 | Mukai et al. | |

FOREIGN PATENT DOCUMENTS

| | | |
|---|---|---|
| EP | 1039569 A1 | 9/2000 |
| EP | 2690688 A1 | 1/2014 |
| EP | 2711378 A1 | 3/2014 |
| JP | 4-188559 A | 7/1992 |
| JP | 5-21068 A | 1/1993 |
| JP | 5-74461 A | 3/1993 |
| JP | 7-226205 A | 8/1995 |
| JP | 7-240201 A | 9/1995 |
| JP | 8-264180 A | 10/1996 |
| JP | 10-284082 A | 10/1998 |
| JP | 10-294112 A | 11/1998 |
| JP | 10-302799 A | 11/1998 |
| JP | 2002-117857 A | 4/2002 |
| JP | 2006-156228 A | 6/2006 |
| JP | 2006-269827 A | 10/2006 |
| JP | 2011-18575 A | 1/2011 |
| JP | 2012-64574 A | 3/2012 |
| JP | 2013-211161 A | 10/2013 |
| KR | 2009-0019630 A | 2/2009 |
| KR | 20090019630 A * | 2/2009 |
| WO | WO 2004/049475 A1 | 6/2004 |
| WO | WO 2007/083874 A1 | 7/2007 |
| WO | WO 2012/133034 A1 | 10/2012 |
| WO | WO 2012/157450 A1 | 11/2012 |
| WO | WO 2013/154196 A1 | 10/2013 |
| WO | WO 2014/057627 A1 | 4/2014 |

OTHER PUBLICATIONS

Machine translation of KR2009-0019630.*
"Lithium Secondary Batteries," Published by Ohmsha Ltd., Mar. 20, 2008.
European Patent Office, Extended European Search Report for Application No. 14817001.2, dated Dec. 12, 2016, 10 pages, Germany.

* cited by examiner

*Primary Examiner* — Haidung D Nguyen
(74) *Attorney, Agent, or Firm* — Alston & Bird LLP

(57) ABSTRACT

A negative electrode mixture for a nonaqueous electrolyte secondary cell according to the present invention includes: a negative electrode active material; a conductive assistant; and a binder. The binder contains a copolymer of vinyl alcohol and an alkali metal-neutralized product of ethylene-unsaturated carboxylic acid.

17 Claims, No Drawings

NEGATIVE-ELECTRODE MIXTURE FOR NON-AQUEOUS ELECTROLYTE SECONDARY CELL, NEGATIVE ELECTRODE FOR NON-AQUEOUS ELECTROLYTE SECONDARY CELL CONTAINING SAID MIXTURE, NON-AQUEOUS ELECTROLYTE SECONDARY CELL PROVIDED WITH SAID NEGATIVE ELECTRODE, AND ELECTRICAL DEVICE

CROSS-REFERENCE TO RELATED APPLICATIONS

This application is a U.S. National Stage Application filed under 35 U.S.C. 371 of PCT/JP2014/001586, filed Mar. 19, 2014, which claims benefit of Japanese Application No. 2013-136116, filed Jun. 28, 2013, the contents of each of which are hereby incorporated herein in their entirety by reference.

TECHNICAL FIELD

The present invention relates to a negative electrode mixture for a nonaqueous electrolyte secondary cell, a nonaqueous electrolyte secondary cell negative electrode containing the mixture, a nonaqueous electrolyte secondary cell including the negative electrode, and an electrical device.

BACKGROUND ART

In recent years, with widespread use of portable electronic devices such as notebook computers, smartphones, portable game devices, and personal digital assistants (PDAs), the need for reducing the size of secondary cells for use as power sources and increasing the energy density has been growing in order to reduce the weight of these devices and to achieve the use of these devices for a longer period of time.

Particularly in recent years, secondary cells have been more widely used as power sources for vehicles, such as electric vehicles and electric motorcycles. Secondary cells for use also as such power sources for vehicles need not only to have a higher energy density, but also to be capable of operating in a wide temperature range.

Nickel-cadmium cells, nickel-hydrogen cells, and other suitable cells have conventionally been mainstream non-aqueous electrolyte secondary cells. However, to satisfy the demand for reducing the size of secondary cells and increasing the energy density, lithium ion secondary cells tend to be more frequently used.

A lithium ion secondary cell includes electrodes each obtained by coating a current collector with an electrode mixture that contains an active material, a binder, and a conductive assistant, and drying the coating on the current collector.

For example, a positive electrode is obtained by coating an aluminum foil current collector with slurry of a positive electrode mixture in which $LiCoO_2$ serving as an active material, polyvinylidene fluoride (PVdF) serving as a binder, and carbon black serving as a conductive assistant are dispersed in a dispersion medium, and drying the slurry coated on the current collector.

On the other hand, a negative electrode is obtained by coating a copper foil current collector with slurry of a negative electrode mixture in which graphite serving as an active material, carboxymethylcellulose (CMC), styrene-butadiene-rubber (SBR), PVdF, or polyimide serving as a binder, and carbon black serving as a conductive assistant are dispersed in a dispersion medium, and drying the slurry coated on the current collector.

CITATION LIST

Patent Documents

PATENT DOCUMENT 1: Japanese Unexamined Patent Publication No. H08-264180
PATENT DOCUMENT 2: Japanese Unexamined Patent Publication No. H04-188559
PATENT DOCUMENT 3: Japanese Unexamined Patent Publication No. H10-284082
PATENT DOCUMENT 4: Japanese Unexamined Patent Publication No. H07-240201
PATENT DOCUMENT 5: Japanese Unexamined Patent Publication No. H10-294112
PATENT DOCUMENT 6: International Publication No. WO 2004/049475
PATENT DOCUMENT 7: Japanese Unexamined Patent Publication No. H10-302799
PATENT DOCUMENT 8: Japanese Unexamined Patent Publication No. H05-21068
PATENT DOCUMENT 9: Japanese Unexamined Patent Publication No. H05-74461
PATENT DOCUMENT 10: Japanese Unexamined Patent Publication No. 2006-156228
PATENT DOCUMENT 11: Japanese Unexamined Patent Publication No. 2012-64574

Non-Patent Document

NON-PATENT DOCUMENT 1: "LITHIUM SECONDARY BATTERIES," p. 132 (published by Ohmsha Ltd. on Mar. 20, 2008)

SUMMARY

With the wider use of lithium ion secondary cells, various types of graphite have been studied as negative electrode active materials directly contributing to electrode reaction in order to achieve stability in a wide temperature range, in particular, at high temperatures of 45° C. or higher, and an increase in capacity. In particular, it has been known that the crystalline states of artificial graphites vary according to differences in raw material, carbonization temperature and other factors, leading to variations in the energy capacity of the negative electrode active materials. Thus, various types of graphite such as easily graphitizable carbon (soft carbon), hardly graphitizable carbon (hard carbon), carbon fibers, and other types of graphites have been studied (see Patent Documents 1-3).

To further increase the capacity of lithium ion secondary cells, various compounds have been suggested as electrode active materials directly contributing to electrode reaction. Silicon (Si), tin (Sn), and germanium (Ge) that can be alloyed with lithium, oxides and alloys of them, and any other suitable materials have been studied as negative electrode active materials. These negative electrode active materials have higher theoretical capacity density than a carbon material. In particular, silicon-containing particles such as silicon particles or silicon oxide particles are inexpensive, and thus have been widely studied (see Patent Documents 4 and 5 and Non-Patent Document 1).

However, it has been known that if silicon-containing particles, such as silicon particles or silicon oxide particles, are used as a negative electrode active material, the volume of the negative electrode active material varies significantly due to insertion and extraction of lithium ions in charge/discharge, and thus, a negative electrode mixture may be separated from a negative electrode current collector, or the negative electrode active material may be eliminated.

Furthermore, if various types of graphite are used as negative electrode active materials, the surface state, surface area, and density of a crystallite layer, and other parameters vary. Thus, polyvinylidene fluoride (PVDF) that has conventionally been used as a binder needs to be used in large amounts due to its low binding force and flexibility. In addition, since PVDF is soluble only in an organic solvent, a binder that can reduce the load on the environment has been required (see Patent Documents 6 and 7). The binding capability cannot be sufficiently retained, in particular, in the high temperature range of 45° C. or higher, and thus, the life of an associated electrode may be reduced, or discharge characteristics may be degraded.

On the other hand, it has been considered to use styrene-butadiene-rubber (SBR) that is a rubbery polymer as a water-based binder that is expected to reduce the load on the environment without decreasing the binding force. However, since the SBR being an insulator and having the properties of rubber is present on the surface of an active material, sufficient rate performance is not obtained. Further, while the SBR is usually used as an emulsion, it does not have the function of increasing viscosity by itself, and thus, electrode slurry, if prepared using the SBR, cannot be applied. Therefore, the electrode slurry needs to contain carboxymethylcellulose (CMC), polyacrylic acid, polyvinyl alcohol, polyoxymethylene, or any other suitable material as a thickener, thus causing problems, such as the coating of an electrode active material with such a thickener or a decrease in the proportion of the active material (see Patent Documents 8 and 9). Furthermore, to address these problems, an acrylic acid vinyl alcohol copolymer which does not require an additional thickener may be used as a binder in a process of fabricating an electrode using an organic solvent just like the conventional art. However, documents showing such a technique are also silent about the high temperature range of 45° C. or higher (see Patent Document 10).

It is therefore one object of the present invention to provide a material that exhibits a binding force and binding persistence both high enough to prevent separation of a negative electrode mixture from a negative electrode current collector and the elimination of a negative electrode active material both arising from a change in volume of the negative electrode active material due to repeated charges and discharges, and has the binding force and binding persistence, in particular, even at temperatures of 45° C. or higher and a thickening function, and to provide a nonaqueous electrolyte secondary cell negative electrode mixture that is prepared in the form of slurry containing water as a dispersant and does not reduce the capacity of the negative electrode active material.

As a result of the present inventors' study to address the problems, the inventors have discovered that use of a nonaqueous electrolyte secondary cell negative electrode mixture containing a particular binder prevents the separation of the negative electrode mixture from a negative electrode current collector or the elimination of a negative electrode active material, and provides a nonaqueous electrolyte secondary cell exhibiting excellent life characteristics. Thus, the inventors have completed the present invention.

A negative electrode mixture for a nonaqueous electrolyte secondary cell according to the present invention includes: a negative electrode active material; a conductive assistant; and a binder containing a copolymer of vinyl alcohol and an alkali metal-neutralized product of ethylene-unsaturated carboxylic acid.

A content of the copolymer of the vinyl alcohol and the alkali metal-neutralized product of ethylene-unsaturated carboxylic acid in the binder is preferably greater than or equal to 20% by mass and less than or equal to 100% by mass and more preferably greater than or equal to 30% by mass and less than or equal to 100% by mass.

A content of the binder relative to the total mass of the negative electrode active material, the conductive assistant, and the binder is preferably greater than or equal to 0.5% by mass and less than or equal to 40% by mass.

A copolymer composition ratio of the alkali metal-neutralized product of ethylene-unsaturated carboxylic acid to the vinyl alcohol in the copolymer is preferably 95/5-5/95 in terms of a molar ratio. In other words, the molar ratio of the alkali metal-neutralized product of ethylene-unsaturated carboxylic acid to the vinyl alcohol in the copolymer is preferably greater than or equal to 5/95 and less than or equal to 19 on a monomer basis.

The alkali metal-neutralized product of ethylene-unsaturated carboxylic acid is preferably an alkali metal-neutralized product of acrylic acid or an alkali metal-neutralized product of methacrylic acid.

The negative electrode active material is preferably at least one selected from the group consisting of silicon, a silicon compound, and a carbon material.

Moreover, the negative electrode active material is preferably a complex of the carbon material and the silicon or the silicon compound. The complex herein is, for example, a mixture or a support.

A ratio of the carbon material to the silicon or the silicon compound in the complex of the carbon material and the silicon or the silicon compound is preferably 5/95-95/5 in terms of a mass ratio.

The carbon material is preferably amorphous carbon.

The amorphous carbon is preferably soft carbon or hard carbon.

The conductive assistant preferably contains a carbon nanofiber or a carbon nanotube.

A content of the carbon nanofiber or the carbon nanotube in the conductive assistant is preferably greater than or equal to 5% by mass and less than or equal to 100% by mass.

A negative electrode for a nonaqueous electrolyte secondary cell according to the present invention is fabricated using the negative electrode mixture for the nonaqueous electrolyte secondary cell.

A nonaqueous electrolyte secondary cell according to the present invention includes the negative electrode for the nonaqueous electrolyte secondary cell.

An electrical device according to the present invention includes the nonaqueous electrolyte secondary cell.

According to the present invention, a nonaqueous secondary cell negative electrode mixture including a specific binder is used, which allows for providing a nonaqueous electrode mixture including a specific binder is used, which allows for providing a nonaqueous electrolyte secondary cell negative electrode and a nonaqueous electrolyte secondary cell both having good stability. Thus, the nonaqueous electrolyte secondary cell according to the present invention has better life characteristics than a conventional nonaqueous electrolyte secondary cell. This allows for, both enhancing the cell function and reducing the cost, and thus makes the nonaqueous electrolyte secondary cell applicable in a wider range.

DESCRIPTION OF EMBODIMENTS

A negative electrode mixture for a nonaqueous electrolyte secondary cell, a nonaqueous electrolyte secondary cell negative electrode containing the mixture, and a nonaqueous electrolyte secondary cell according to an embodiment of the present invention will now be described.

<Negative Electrode Mixture for Nonaqueous Electrolyte Secondary Cell>

A negative electrode mixture for a nonaqueous electrolyte secondary cell according to this embodiment is characterized by including a negative electrode active material, a conductive assistant, and a binder which contains a copolymer of vinyl alcohol and an alkali metal-neutralized product of ethylene-unsaturated carboxylic acid.

(Binder)

The copolymer of the vinyl alcohol and the alkali metal-neutralized product of ethylene-unsaturated carboxylic acid for use as a binder in this embodiment is obtained by polymerizing a monomer containing vinyl ester as a main component and a monomer containing ethylene-unsaturated carboxylic acid ester as a main component in the presence of a polymerization catalyst to form a vinyl ester/ethylene-unsaturated carboxylic acid ester copolymer, and saponifying the copolymer in a mixed solvent of an aqueous organic solvent and water in the presence of alkali containing an alkali metal.

Examples of the vinyl ester include vinyl acetate, vinyl propionate, and vinyl pivalate. However, to facilitate the progression of saponification, the vinyl ester is preferably vinyl acetate. These vinyl ester materials may be used alone or two or more of them may be used in combination.

Examples of the ethylene-unsaturated carboxylic acid ester include methyl ester, ethyl ester, n-propyl ester, iso-propyl ester, n-butyl ester, or t-butyl ester of acrylic acid or methacrylic acid. However, to facilitate the progression of saponification, the ethylene-unsaturated carboxylic acid ester is preferably the methyl acrylate or methyl methacrylate. Any one of these ethylene-unsaturated carboxylic acid ester materials may be used alone or two or more of them may be used in combination.

If necessary, any other ethylene-unsaturated monomer copolymerizable with vinyl ester and ethylene-unsaturated carboxylic acid ester, or a crosslinker may also be copolymerized.

Saponification in which a vinyl acetate/methyl acrylate copolymer is perfectly saponified with potassium hydroxide (KOH) is shown below as an example of saponification in this embodiment.

[Chemical Formula 1]

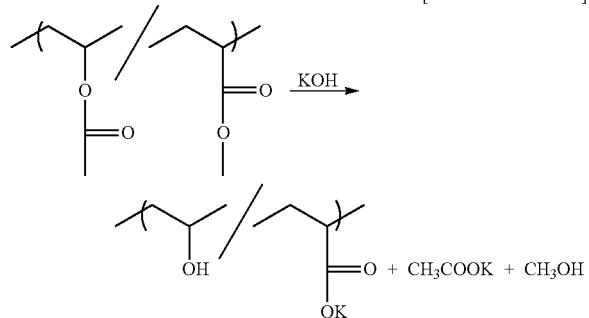

The copolymer of the vinyl alcohol and the alkali metal-neutralized product of ethylene-unsaturated carboxylic acid for use in this embodiment as described above is a substance obtained by randomly copolymerizing vinyl ester and ethylene-unsaturated carboxylic acid ester and saponifying an ester portion derived from the associated monomer. The bond between the monomers is a C—C covalent bond (hereinafter may be referred to as a saponified product of a vinyl ester/ethylene-unsaturated carboxylic acid ester copolymer).

On the other hand, Patent Document 5 describes a crosslinked compound of polyacrylic acid substituted with alkali cations and polyvinyl alcohol. This crosslinked compound has a structure in which polyacrylic acid and polyvinyl alcohol are crosslinked by an ester bond. Thus, the crosslinked compound of the polyacrylic acid substituted with alkali cations and the polyvinyl alcohol as described in Patent Document 5 is a substance clearly different from the copolymer of the vinyl alcohol and the alkali metal-neutralized product of ethylene-unsaturated carboxylic acid according to the embodiment.

In the copolymer of this embodiment, the molar ratio of ethylene-unsaturated carboxylic acid ester to vinyl ester is preferably 95/5-5/95, more preferably 95/5-50/50, and even more preferably 90/10-60/40. The molar ratio deviating from the range of 95/5-5/95 is not preferable in some cases because a polymer obtained after saponification may be deficient in retentivity required of a binder.

Thus, the copolymer composition ratio of the alkali metal-neutralized product of ethylene-unsaturated carboxylic acid to the vinyl alcohol in the copolymer of them thus obtained is preferably 95/5-5/95, more preferably 95/5-50/50, and even more preferably 90/10-60/40 in terms of the molar ratio.

The alkali metal-neutralized product of ethylene-unsaturated carboxylic acid is preferably an alkali metal-neutralized product of acrylic acid or an alkali metal-neutralized product of methacrylic acid.

To obtain the copolymer in the form of powder, the vinyl ester/ethylene-unsaturated carboxylic acid ester copolymer, which is a precursor of the copolymer of the vinyl alcohol and the alkali metal-neutralized product of ethylene-unsaturated carboxylic acid, is preferably obtained by suspension polymerization in which a monomer containing vinyl ester as the main component and a monomer containing ethylene-unsaturated carboxylic acid ester as the main component are polymerized into polymer particles while being suspended in an aqueous solution containing a polymerization catalyst and a dispersant dissolved.

Examples of the polymerization catalyst include organic peroxides such as benzoyl peroxide and lauryl peroxide, and azo compounds such as azobisisobutyronitrile and azobisdimethylvaleronitrile. In particular, lauryl peroxide is preferable.

The content of the polymerization catalyst added in the total mass of the monomers is preferably 0.01-5% by mass, more preferably 0.05-3% by mass, and even more preferably 0.1-3% by mass. If the content is less than 0.01% by mass, polymerization reaction is not sometimes completed. If the content is greater than 5% by mass, the binding performance of the copolymer of the vinyl alcohol and the alkali metal-neutralized product of ethylene-unsaturated carboxylic acid obtained is not sometimes high enough.

An appropriate substance needs to be selected as the dispersant for use in performing polymerization, in accordance with the types and amounts of the monomers used, and other parameters. Specific examples of the dispersant include water-soluble polymers such as polyvinyl alcohol (partially saponified polyvinyl alcohol, fully saponified polyvinyl alcohol), poly(meth)acrylic acid and its salt, polyvinyl pyrrolidone, methylcellulose, carboxymethylcellulose, hydroxyethyl cellulose, and hydroxypropyl cellulose, and water-insoluble inorganic compounds such as calcium phosphate and magnesium silicate. These dispersant materials may be used alone or two or more of them may be used in combination.

The content of the dispersant used is preferably 0.01-10% by mass and more preferably 0.05-5% by mass relative to the total mass of the monomers, depending on the types of the monomers used and other factors.

Moreover, to adjust the surface-active performance and other suitable functions of the dispersant, a water-soluble salt such as alkali metal or alkaline earth metal may be added. Examples of the water-soluble salt include sodium chloride, potassium chloride, calcium chloride, lithium chloride, anhydrous sodium sulfate, potassium sulfate, disodium hydrogen phosphate, dipotassium hydrogen phosphate, trisodium phosphate, and tripotassium phosphate. These water-soluble salts may be used alone or two or more of them may be used in combination.

The content of the water-soluble salt used is usually 0.01-10% by mass relative to the mass of an aqueous solution of the dispersant, depending on the type and amount of the dispersant used and other factors.

The temperature at which the monomers are polymerized is preferably −20° C. to +20° C. and more preferably −10° C. to +10° C. relative to the ten-hour half-life temperature of the polymerization catalyst.

If the temperature is lower than −20° C. relative to the ten-hour half-life temperature, polymerization reaction is not sometimes completed. If the temperature is higher than +20° C., the binding performance of the copolymer of the vinyl alcohol and the alkali metal-neutralized product of ethylene-unsaturated carboxylic acid obtained is not sometimes high enough.

The period of time over which the monomers are polymerized is usually several hours to several tens of hours, depending on the type, amount, and polymerization temperature of the polymerization catalyst used and other factors.

After polymerization reaction has completed, the copolymer is separated by a process such as centrifugation or filtration, and is obtained in a wet cake form. The copolymer obtained in the wet cake form may be used for saponification as it is or after being dried if necessary.

The number average molecular weight of the polymer can be determined with a molecular weight measuring device including a polar solvent, such as DMF, as a solvent, a gel filtration chromatography (GFC) column (OH pak manufactured by Shodex), and other components.

The number average molecular weight of the copolymer before saponification is preferably 10,000-1,000,000 and more preferably 50,000-800,000. Confining the number average molecular weight before saponification within the range of 10,000-1,000,000 improves the binding force of the binder. This facilitates applying a heavy coating of slurry even if the negative electrode mixture is water-based slurry.

A conventionally known alkali may be used as an alkali containing alkali metal for use in the saponification. Alkali metal hydroxides are preferable, and in particular, sodium hydroxide and potassium hydroxide are preferable because of their high reactivity.

The content of the alkali is preferably 60-140 mol % and more preferably 80-120 mol % relative to the number of moles of the monomers. If the alkali content is less than 60 mol %, saponification may be insufficient. Use of alkali in an amount greater than 140 mol % is not economical because additional advantages are not obtained.

Examples of the aqueous organic solvent in the mixed solvent of the aqueous organic solvent and water for use in the saponification include lower alcohols such as methanol, ethanol, n-propanol, isopropanol, n-butanol, and t-butanol, ketones such as acetone and methyl ethyl ketone, and mixtures of these materials. Among these aqueous organic solvents, lower alcohols are preferable, and in particular, methanol or ethanol is preferable, because using methanol or ethanol provides a copolymer of vinyl alcohol and an alkali metal-neutralized product of ethylene-unsaturated carboxylic acid with excellent binding performance and excellent resistance to mechanical shear.

The mass ratio of the aqueous organic solvent to water in the mixed solvent of the aqueous organic solvent and water is preferably 3/7-8/2, more preferably 3/7-7/3, and even more preferably 4/6-6/4. If the mass ratio is outside the range of 3/7-8/2, the copolymer before or after saponification may have insufficient compatibility with the solvent, which may prevent sufficient progress of saponification. If the ratio of the aqueous organic solvent is less than 3/7, the binding force of the binder decreases, and in addition, it is difficult to obtain industrially a saponified product of a vinyl ester/ethylene-unsaturated carboxylic acid ester copolymer because the viscosity significantly increases after saponification. If the ratio of the aqueous organic solvent is greater than 8/2, the water solubility of the saponified product of the vinyl ester/ethylene-unsaturated carboxylic acid ester copolymer obtained decreases. Thus, using the saponified product of the vinyl ester/ethylene-unsaturated carboxylic acid ester copolymer thus obtained as a material of the electrode may impair the binding force after drying. Note that if a copolymer in the wet cake form is used for saponification as it is, water in the copolymer in the wet cake form is taken into account in the mass ratio of the aqueous organic solvent to water.

The temperature at which the vinyl ester/ethylene-unsaturated carboxylic acid ester copolymer is saponified is preferably 20-60° C. and more preferably 20-50° C., depending on the molar ratio between the monomers. If the copolymer is saponified at a temperature lower than 20° C., saponification is not sometimes completed, and if the copolymer is saponified at a temperature higher than 60° C., reaction system may be thickened to make stirring impossible.

The saponification time varies according to the type and amount of alkali used and other factors. Saponification is usually completed in about several hours.

Upon completion of the saponification, a dispersing element of a saponified product of the copolymer in the form of paste or slurry is usually formed. After solid-liquid separation of the dispersing element by a conventionally known process such as centrifugation or filtration, the resultant material is well cleaned with a lower alcohol, such as methanol. Then, the resultant liquid-containing saponified product of the copolymer is dried. As a result, the saponified product of the copolymer, i.e., the copolymer of the vinyl alcohol and the alkali metal-neutralized product of ethylene-unsaturated carboxylic acid, is obtainable in the form of spherical single particles or agglomerated particles formed by agglomeration of spherical particles.

The conditions on which the liquid-containing saponified product of the copolymer is dried are not specifically limited. However, in general, the liquid-containing saponified product of the copolymer is preferably dried under normal pressure or reduced pressure at a temperature of 30-120° C.

The drying time is usually several hours to several tens of hours, depending on the pressure and temperature during drying.

The mass average particle size of the copolymer of the vinyl alcohol and the alkali metal-neutralized product of ethylene-unsaturated carboxylic acid is preferably 1-200 μm and more preferably 10-100 μm. If the mass average particle size is less than 1 μm, binding performance may be insufficient. If the mass average particle size is greater than 200 μm, the binding performance may be impaired, because the aqueous solution is not thickened uniformly.

If the liquid-containing saponified product of the copolymer is dried, and the mass average particle size of the resultant saponified product of the copolymer is greater than 100 μm, the mass average particle size can be adjusted to 10-100 μm by pulverizing the resultant saponified product of the copolymer by a conventionally known pulverization process such as mechanical milling.

Mechanical milling is a process in which an external force, such as shock, tension, friction, compression, or shear, is applied to the resultant saponified product of the copolymer. Examples of devices for this process include tumbling mills, vibration mills, planetary mills, rocking mills, horizontal mills, attritor mills, jet mills, grinding machines, homogenizers, fluidizers, paint shakers, and mixers. For example, the planetary mills pulverize or mix a saponified product of copolymer powder by mechanical energy generated by rotating and revolving a container containing the saponified product of the copolymer and a ball. It has been known that this process allows for pulverizing the powder to the nano-order.

The copolymer of the vinyl alcohol and the alkali metal-neutralized product of ethylene-unsaturated carboxylic acid can function as a nonaqueous electrolyte secondary cell negative electrode binder that is superior in binding force and binding persistence. A possible reason for this may be that the copolymer of the vinyl alcohol and the alkali metal-neutralized product of ethylene-unsaturated carboxylic acid allows a current collector and a negative electrode active material to bind tightly to each other and allows active materials to bind tightly to each other to have binding persistence high enough to prevent the separation of the negative electrode mixture from the current collector or the elimination of the negative electrode active material both arising from a change in volume of the negative electrode active material due to repeated charges and discharges, thereby preventing the capacity of the negative electrode active material from decreasing.

The negative electrode mixture of this embodiment may contain, as the binder, any other water-based binder added to the copolymer of the vinyl alcohol and the alkali metal-neutralized product of ethylene-unsaturated carboxylic acid. In this case, the amount of the other water-based binder added is preferably less than 80% by mass and more preferably less than 70% by mass relative to the total mass of the copolymer of the vinyl alcohol and the alkali metal-neutralized product of ethylene-unsaturated carboxylic acid and the other water-based binder. In other words, the content of the copolymer of the vinyl alcohol and the alkali metal-neutralized product of ethylene-unsaturated carboxylic acid in the binder is preferably greater than or equal to 20% by mass and less than or equal to 100% by mass and more preferably greater than or equal to 30% by mass and less than or equal to 100% by mass.

Examples of materials of the other water-based binder include carboxymethylcellulose (CMC), acrylic resins such as polyacrylic acid, sodium polyacrylate, and polyacrylate, sodium alginate, polyimide (PI), polytetrafluoroethylene (PTFE), polyamide, polyamideimide, styrene-butadiene-rubber (SBR), polyvinyl alcohol (PVA), and ethylene-vinyl acetate copolymers (EVA). These materials may be used alone or two or more of them may be used in combination.

Among the materials of the other water-based binder, an acrylic resin represented by sodium polyacrylate, sodium alginate, or polyimide is advantageously used, and in particular, an acrylic resin is advantageously used.

(Negative Electrode Active Material)

Examples of negative electrode active materials include, but not specifically limited to, materials that can insert and extract a large amount of lithium ions, such as silicon (Si) or tin (Sn). Advantages of this embodiment are obtainable as long as any of such a material is used alone or in the form of an alloy, a compound, a solid solution, and a composite active material containing a silicon-containing material or a tin-containing material. Examples of the silicon-containing material include Si, $SiO_x$ (0.05<x<1.95), and alloys, compounds, or solid solutions obtained by substituting at least one element selected from the group consisting of B, Mg, Ni, Ti, Mo, Co, Ca, Cr, Cu, Fe, Mn, Nb, Ta, V, W, Zn, C, N, and Sn for part of Si in any one of Si and $SiO_x$. Such a material can be referred to as silicon or a silicon compound. Examples of the tin-containing material include $Ni_2Sn_4$, $Mg_2Sn$, $SnO_x$ (0<x<2), $SnO_2$, $SnSiO_3$, and LiSnO. These materials may be used alone or two or more of them may be used in combination. In particular, silicon or a silicon compound, such as Si alone or silicon oxide, is preferable.

A complex obtained by mixing silicon or a silicon compound as a first negative electrode active material and a carbon material as a second negative electrode active material is more preferably used as the negative electrode active material. In this case, the first and second negative electrode active materials are preferably mixed in a mass ratio of 5/95-95/5. Any carbon material that is commonly used in a nonaqueous electrolyte secondary cell may be used as the carbon material. Representative examples of the carbon material include crystalline carbon, amorphous carbon, and a combination of them. Examples of the crystalline carbon include graphite such as natural or artificial graphite that is amorphous, plate-like, flake-shaped, spherical, or fibrous. Examples of the amorphous carbon include soft carbon, hard carbon, mesophase pitch-based carbide, and calcined coke. The second negative electrode active material is preferably amorphous carbon, such as soft carbon or hard carbon, and more preferably soft carbon which saves a production cost because of its low processing temperature in production thereof, and is available at low cost.

The negative electrode active material containing silicon or a silicon compound changes in volume by reaction with lithium in charge/discharge, resulting in poor electrical contact between the negative electrode active material and the current collector. This causes rapid decrease in cell capacity by repeating charge and discharge cycles, thereby causing a decrease in cycle life. However, if a carbon material that does not cause significant volume change in charge/discharge, in particular, amorphous carbon, is used as the second negative electrode active material, the risk of poor electrical contact resulting from a change in the volume of silicon or a silicon compound is reduced, and an electrically conductive path is ensured. This allows for more favorable action of such a carbon material.

A process for making a negative electrode active material is not specifically limited. A process for making an active material complex containing a mixture of the first and second negative electrode active materials is not specifically limited as long as both of them are dispersed uniformly.

Examples of the process for making the negative electrode active material by mixing the first and second negative electrode active materials include a process in which the active materials are both placed in a ball mill, and are mixed.

In addition, as the process for making an active material complex, a process of carbonizing, by heating, a precursor of the second negative electrode active material supported on the surfaces of particles of the first negative electrode active material may be employed.

The precursor of the second negative electrode active material is not specifically limited as long as it is a carbon precursor that can turn into a carbon material by heating. Examples of the precursor include glucose, citric acid, pitch, tar, and binder materials for use in an electrode. Examples of the binder materials include polyvinylidene fluoride (PVdF), carboxymethylcellulose (CMC), acrylic resin, sodium polyacrylate, sodium alginate, polyimide (PI), polytetrafluoroethylene (PTFE), polyamide, polyamideimide, polyacryl, styrene-butadiene-rubber (SBR), polyvinyl alcohol (PVA), and ethylene-vinyl acetate copolymers (EVA).

The heating is a process in which heating is performed in a non-oxidizing atmosphere (in a state where it is difficult to oxidize a substance, such as in a reducing atmosphere, in an inert atmosphere, or in a reduced-pressure atmosphere) at 600-4,000° C., and the carbon precursor is thus carbonized to provide electrical conductivity.

Examples of the negative electrode active material include carbon materials, such as crystalline carbon and amorphous carbon, in addition to silicon (Si), silicon compounds, and other suitable materials. Examples of the crystalline carbon include graphite such as natural or artificial graphite which is amorphous, plate-like, flake-shaped, spherical, or fibrous. Examples of the amorphous carbon include easily graphitizable carbon (soft carbon) or hardly graphitizable carbon (hard carbon), mesophase pitch-based carbide, and calcined coke. Among these carbon materials, soft carbon or hard carbon that has been carbonized at a temperature of 2500° C. or lower is preferably contained as the negative electrode active material because of its lithium ion insertion capacity.

(Conductive Assistant)

A conductive assistant is not specifically limited as long as it is electrically conductive. Examples of the conductive assistant include powders of metal, carbon, a conductive polymer, and conductive glass. Among these materials, a spherical, fibrous, needle-like, or massive carbon powder, or carbon powder in any other form is preferable because of its electronic conductivity and its stability with lithium. Examples of the spherical carbon powder include acetylene black (AB), Ketjen black (KB), graphite, thermal black, furnace black, lamp black, channel black, roller black, disk black, soft carbon, hard carbon, graphene, and amorphous carbon. Examples of the fibrous carbon powder include carbon nanotubes (CNTs), and carbon nanofibers (e.g., vapor grown carbon fibers named VGCFs (registered trademark)). These materials may be used alone or two or more of them maybe used in combination.

Among these carbon powders, the fibrous carbon nanofibers or carbon nanotubes are preferable, and the vapor grown carbon fibers that are the carbon nanofibers are more preferable. The reason for this is that a single carbon powder particle can structurally come into contact with two or more active material particles to form a more efficient conductive network in the electrode, and output characteristics are thus improved.

(Negative Electrode Mixture)

A conductive assistant, a binder, and water are added to a negative electrode active material to form slurry in paste form, thereby obtaining a negative electrode mixture. The binder may be previously dissolved in water, or the active material and powder of the binder may be previously mixed, and then, water may be added to the mixed powder to form a mixture of them.

The amount of water for use in the negative electrode mixture is not specifically limited. However, it is preferably about 40-900% by mass, for example, relative to the total mass of the negative electrode active material, the conductive assistant, and the binder. It is not preferable that the amount of water is less than 40% by mass. The reason for this is that the viscosity of the slurry prepared increases, thus preventing the negative electrode active material, the conductive assistant, and the binder from being each uniformly dispersed. It is not preferable that the amount of water is greater than 900% by mass. The reason for this is that the proportion of water is so high that the conductive assistant is difficult to uniformly disperse, and the risk of causing agglomeration of the active material increases, because if a carbon-based conductive assistant is used, carbon sheds water.

The amount of the conductive assistant used is not specifically limited. However, it is preferably about 0.1-20% by mass, more preferably about 0.5-10% by mass, and even more preferably 2-5% by mass, for example, relative to the total mass of the negative electrode active material, the conductive assistant, and the binder. It is not preferable that the amount of the conductive assistant used is less than 0.1% by mass, because the conductivity of the negative electrode cannot be sufficiently improved. It is not preferable that the amount of the conductive assistant used is greater than 20% by mass. The reasons for this are, for example, that the proportion of the active material relatively decreases to thereby make it difficult to obtain high capacity in charge/discharge of the cell, that carbon sheds water to thereby make it difficult to uniformly disperse the conductive assistant, thus causing agglomeration of the active material, and that since the conductive assistant is smaller than the active material, its surface area increases, resulting in an increase in the amount of the binder used.

If carbon nanofibers or carbon nanotubes that are fibrous carbon are used as the conductive assistant, the amount of the carbon nanofibers or the carbon nanotubes used is not specifically limited. However, it is preferably 5-100% by mass and more preferably 30-100% by mass, for example, relative to the entire conductive assistant. It is not preferable that the amount of the carbon nanofibers or the carbon nanotubes used is less than 5% by mass, because a sufficient conductive path is not ensured between the electrode active material and the current collector, and in particular, in high-speed charge/discharge, a sufficient conductive path cannot be formed.

The amount of the binder used is also not specifically limited. However, it is preferably greater than or equal to 0.5% by mass and less than or equal to 30% by mass, more preferably greater than or equal to 2% by mass and less than or equal to 20% by mass, and even more preferably greater than or equal to 3% by mass and less than or equal to 12% by mass. The reason for this is that if the amount of the binder is excessively large, the proportion of the active material relatively decreases to thereby make it difficult to obtain high capacity in charge/discharge of the cell, and if the amount of the binder is excessively small, the binding force is insufficient, and the cycle life characteristic are thus reduced.

If the active material is, for example, powder coated with carbon, or if a carbon-based conductive assistant is used, carbon sheds water in preparing a water-based slurry mixture, the active material or the conductive assistant is thus difficult to uniformly disperse, and the risk of causing agglomeration of the active material tends to increase. This problem may be solved by adding a surfactant to the slurry. Examples of the surfactant effective in that case include saponin, phospholipid, peptide, octylglucoside, sodium dodecyl sulfate, polyoxyethylene sorbitan monolaurate, polyoxyethylene sorbitan monooleate, alkylaryl polyoxyethylene ether, polysorbate, deoxycholate, and triton. The surfactant needs to be added to the whole mixture in a proportion of about 0.01-0.1% by mass.

(Negative Electrode)

A negative electrode can be fabricated using a technique for use in this technical field.

A current collector of the negative electrode is not specifically limited as long as it is made of a material having electronic conductivity and allowing electrical current to pass through the negative electrode material retained. Examples of this current collector material include conductive substances such as C, Cu, Ni, Fe, V, Nb, Ti, Cr, Mo, Ru, Rh, Ta, W, Os, Ir, Pt, Au, and Al, and alloys containing two or more of these conductive substances (e.g., stainless steel). Alternatively, iron plated with copper may also be used. As the current collector, C, Ni, stainless steel, or any other suitable material is preferably used because of its high electrical conductivity and its high stability and resistance to oxidation in an electrolyte, and Cu or Ni is more preferably used because of its material cost.

The shape of the current collector is not specifically limited. However, a foil-like substrate or a three-dimensional substrate may be used. Using, in particular, a three-dimensional substrate (a metal foam, a mesh, a woven fabric, a nonwoven fabric, an expanded substrate, or any other suitable material) provides an electrode having high capacity density even if the binder lacks the adhesion to the current collector. In addition, favorable high-rate charge/discharge characteristics are obtained.

<Cell>

A nonaqueous electrolyte secondary cell of this embodiment may be obtained using a nonaqueous electrolyte secondary cell negative electrode of this embodiment.

A lithium ion secondary cell among nonaqueous electrolyte secondary cells of this embodiment needs to contain lithium ions, and a lithium salt is thus preferably used as an electrolyte salt. This lithium salt is not specifically limited. Specific examples of the lithium salt include lithium hexafluorophosphate, lithium perchlorate, lithium tetrafluoroborate, lithium trifluoromethanesulfonate, and lithium trifluoromethanesulfonimide. These lithium salts may be used alone or two or more of them may be used in combination. Since the lithium salt has high electronegativity, and is easily ionized, excellent charge/discharge cycle characteristics can be obtained, and the charge/discharge capacity of the secondary cell can be increased.

Examples of a solvent of the electrolyte include propylene carbonate, ethylene carbonate, dimethyl carbonate, diethyl carbonate, and γ-butyrolactone. These solvents may be used alone or two or more of them may be used in combination. In particular, propylene carbonate alone, a mixture of ethylene carbonate and diethyl carbonate, or γ-butyrolactone alone is advantageously used. Note that the mixture ratio of one of ethylene carbonate and diethyl carbonate to the other in the mixture of them may be optionally adjusted within the range from 10% by volume to 90% by volume.

The electrolyte of the lithium secondary cell of this embodiment may be a solid state electrolyte or ionic liquid.

The lithium secondary cell configured as described above can function as a lithium secondary cell having good life characteristics.

The configuration of the lithium secondary cell is not specifically limited.

However, this configuration is applicable to the forms and configurations of existing cells, such as layered cells or wound cells.

<Electrical Device>

A nonaqueous electrolyte secondary cell including the negative electrode of this embodiment has good life characteristics, and is usable as a power source for various electrical devices (including electrically powered vehicles).

Examples of the electrical devices include portable television sets, notebook computers, tablets, smartphones, personal computer keyboards, personal computer displays, desktop personal computers, CRT monitors, personal computer racks, printers, all-in-one personal computers, wearable computers, word processors, mice, hard disks, personal computer peripherals, irons, cooling devices, refrigerators, warm air heaters, electric carpets, clothes dryers, futon dryers, humidifiers, dehumidifiers, window fans, blowers, ventilator fans, toilet seats with a cleaning function, car navigation systems, flashlights, lighting equipment, portable karaoke systems, microphones, air cleaners, sphygmomanometers, coffee mills, coffee makers, kotatsu, mobile phones, game machines, music recorders, music players, disk changers, radios, shavers, juicers, shredders, water purifiers, dish dryers, car stereos, stereos, speakers, headphones, transceivers, trouser presses, cleaners, body fat scales, weight scales, health-meters, movie players, electric rice cookers, electric razors, desk lamps, electric pots, electronic game machines, portable game machines, electronic dictionaries, electronic organizers, electromagnetic cookers, electric calculators, electric carts, electric wheelchairs, electric tools, electric toothbrushes, heating pads, haircut tools, telephones, clocks, intercoms, electric bug killers, hot plates, toasters, dryers, electric drills, water heaters, panel heaters, mills, soldering irons, video cameras, facsimiles, food processors, massagers, miniature bulbs, mixers, sewing machines, rice cake makers, remote controllers, water coolers, air coolers, beaters, electronic musical instruments, motorcycles, toys, lawn mowers, fishing buoys, bicycles, motor vehicles, hybrid vehicles, plug-in hybrid vehicles, electric vehicles, railroads, ships, airplanes, and emergency storage batteries.

EXAMPLES

This embodiment will now be more specifically described with reference to examples. However, these examples are merely examples of the present invention.

Preparation of Binder

First Preparation Example

Synthesis of Vinyl Ester/Ethylene-Unsaturated Carboxylic Acid Ester Copolymer

First, 768 g of water and 12 g of sodium sulfate anhydrate were charged into a reaction vessel having a capacity of 2 L and including an agitator, a thermometer, an $N_2$ gas introduction pipe, a reflux condenser, and a dropping funnel, and $N_2$ gas was blown to dioxide this system. Subsequently, 1 g of partially saponified polyvinyl alcohol (the degree of saponification: 88%) and 1 g of lauryl peroxide were charged in the reaction vessel, and the inside temperature was increased to 60° C. Then, monomers of 104 g of methyl acrylate (1.209 mol) and 155 g of vinyl acetate (1.802 mol) were dropped through the dropping funnel for four hours, and then, this reaction vessel was maintained at an inside temperature of 65° C. for two hours, thereby completing the reaction. Thereafter, a solid content was filtered to obtain 288 g of a vinyl ester/ethylene-unsaturated carboxylic acid ester copolymer (having a water content of 10.4%). The polymer obtained was dissolved in dimethylformamide (DMF), and then filtration was performed by a filter. The number average molecular weight of the resultant material determined by a molecular weight detector (2695 and an RI detector 2414, manufactured by Waters Corporation) was 188,000.

Second Preparation Example

Synthesis of Saponified Product of Vinyl Ester/Ethylene-Unsaturated Carboxylic Acid Ester Copolymer First, 450 g of methanol, 420 g of water, 132 g (3.3 mol) of sodium hydroxide, and 288 g of the water-containing copolymer (having a water content of 10.4%) obtained in the first preparation example were charged into a reaction vessel similar to that described above, and were saponified at 30° C. for three hours under stirring. After completion of the saponification, the resultant saponified product of the copolymer was cleaned with methanol, was filtered, and was dried at 70° C. for six hours, thereby obtaining 193 g of a saponified product of the vinyl ester/ethylene-unsaturated carboxylic acid ester copolymer (a copolymer of vinyl alcohol and an alkali metal-neutralized product of ethylene-unsaturated carboxylic acid, where alkali metal was sodium). The mass average particle size of the saponified product of the vinyl ester/ethylene-unsaturated carboxylic acid ester copolymer was 180 μm.

Third Preparation Example

Pulverization of Saponified Product of Vinyl Ester/Ethylene-Unsaturated Carboxylic Acid Ester Copolymer First, 193 g of the saponified product of the vinyl ester/ethylene-unsaturated carboxylic acid ester copolymer was pulverized by a jet mill (U manufactured by Nippon Pneumatic Mfg. Co., Ltd.), thereby obtaining 173 g of the saponified product of the vinyl ester/ethylene-unsaturated carboxylic acid ester copolymer in impalpable form. The particle size of the saponified product of the copolymer obtained was measured with a laser diffraction particle size analyzer (SALD-7100 manufactured by Shimadzu Corporation), and the volume average particle size measured was converted to the mass average particle size. The mass average particle size was 39 μm. The saponified product of the vinyl ester/ethylene-unsaturated carboxylic acid ester copolymer obtained in the third preparation example will be hereinafter referred to as a copolymer 1.

The viscosity of a one-mass-percent solution of the copolymer 1 obtained was 1,630 mPa·s, and the composition ratio of ethylene-unsaturated carboxylic acid ester to vinyl ester in the copolymer was 6/4 in terms of the molar ratio.

Fourth Preparation Example

Operations similar to those in the first through third preparation examples were performed, except that 51.8 g (0.602 mol) of methyl acrylate and 207.2 g (2.409 mol) of vinyl acetate were used instead of 104 g (1.209 mol) of methyl acrylate and 155 g (1.802 mol) of vinyl acetate in the first preparation example, thereby obtaining a copolymer 2. The mass average particle size of the copolymer obtained was 34 μm.

The viscosity of a one-mass-percent solution of the copolymer 2 obtained was 200 mPa·s, and the composition ratio of ethylene-unsaturated carboxylic acid ester to vinyl ester in the copolymer was 8/2.

(Fabrication of Si/C Negative Electrode)

First Example

Ten parts by mass of Si (Si: 5-10 μm, made by FUKUDA METAL FOIL & POWDER Co., LTD.) and 90 parts by mass of C (amorphous carbon, soft carbon) were used as starting materials, and were subjected to mechanical milling (at room temperature, at normal pressure, and in an argon gas atmosphere) using a batch type high-speed planetary mill (High G BX254E made by KURIMOTO, LTD.) including a ball and a container that are made of zirconia, thereby forming composite powder containing Si having a surface coated with soft carbon (Si/C=1/9 complex).

Next, a negative electrode mixture slurry was prepared by mixing 85 parts by mass of the active material obtained above (Si/C=1/9 complex), 10 parts by mass of a copolymer of vinyl alcohol and an alkali metal-neutralized product of ethylene-unsaturated carboxylic acid obtained in the third preparation example (copolymer 1), 3 parts by mass of acetylene black (AB) (Product Name: Denka Black (registered trademark), made by DENKI KAGAKU KOGYO KABUSIKI KAISHA), 2 parts by mass of vapor grown carbon fibers (VGCFs made by Showa Denko K.K.), and 400 parts by mass of water.

The mixture obtained was applied onto a 40-μm-thick electrolytic copper foil, and was dried. Then, the electrolytic copper foil and the applied film were tightly bonded together. Next, heating (under a reduced pressure at 180° C. for three or more hours) was performed to fabricate a negative electrode. The thickness of an active material layer was 152 μm, and the capacity density of the negative electrode was 3.0 mAh/cm$^2$.

Second Example

A negative electrode was fabricated in a manner similar to that in the first example, except that another active material (Si/C=3/7 complex) was used instead of the active material (Si/C=1/9 complex) in the first example. The thickness of an active material layer was 100 μm, and the capacity density of the negative electrode was 3.0 mAh/cm$^2$.

Third Example

A negative electrode was fabricated in a manner similar to that in the first example, except that another active material (Si/C=5/5 complex) was used instead of the active material (Si/C=1/9 complex) in the first example. The thickness of an active material layer was 26 μm, and the capacity density of the negative electrode was 3.0 mAh/cm².

Fourth Example

A negative electrode was fabricated in a manner similar to that in the first example, except that another active material (Si/C=9/1 complex) was used instead of the active material (Si/C=1/9 complex) in the first example. The thickness of an active material layer was 15 μm, and the capacity density of the negative electrode was 3.0 mAh/cm².

Fifth Example

A negative electrode was fabricated in a manner similar to that in the second example, except that the vapor grown carbon fibers (VGCFs) were used instead of acetylene black (AB), while the proportion of the conductive assistant in the electrode in the second example is unchanged. In other words, only 5 parts by mass of VGCFs were added as the conductive assistant. The thickness of an active material layer was 100 μm, and the capacity density of the negative electrode was 3.0 mAh/cm².

First Comparative Example

A negative electrode was fabricated in a manner similar to that in the second example, except that polyvinylidene fluoride (PVdF, Product Name: KF polymer L #1120 made by Kureha Chemical Industry Co., Ltd.) was used instead of the copolymer of the vinyl alcohol and the alkali metal-neutralized product of ethylene-unsaturated carboxylic acid (copolymer 1) in the second example, and N-methyl pyrrolidone (NMP) was used as the dispersion medium instead of water therein. The thickness of an active material layer was 28 μm.

Second Comparative Example

A negative electrode was fabricated in a manner similar to that in the second example, except that carboxymethylcellulose (CMC) was used instead of the copolymer of the vinyl alcohol and the alkali metal-neutralized product of ethylene-unsaturated carboxylic acid (copolymer 1) in the second example. A negative electrode mixture of the second comparative example had a low binding force to an electrolytic copper foil, and peeled off after being dried.

Third Comparative Example

A negative electrode was fabricated in a manner similar to that in the second example, except that polyvinyl alcohol (PVA) was used instead of the copolymer of the vinyl alcohol and the alkali metal-neutralized product of ethylene-unsaturated carboxylic acid (copolymer 1) in the second example. A negative electrode mixture of the third comparative example had a low binding force to an electrolytic copper foil, and peeled off after being dried.

Fourth Comparative Example

A negative electrode was fabricated in a manner similar to that in the second example, except that sodium polyacrylate (PAANa) was used instead of the copolymer of the vinyl alcohol and the alkali metal-neutralized product of ethylene-unsaturated carboxylic acid (copolymer 1) in the second example. A negative electrode mixture of the fourth comparative example had a low binding force to an electrolytic copper foil, and peeled off after being dried.

Table 1 shows the composition of each negative electrode.

TABLE 1

| | Active Material Si/C | Binder | Conductive Assistant 1 | Conductive Assistant 2 | Mixture Ratio of Active Material to Binder to Conductive Assistant 1 to Conductive Assistant 2 (% by mass) |
|---|---|---|---|---|---|
| 1st Ex. | 1/9 | Copolymer 1 | AB | Vapor Grown Carbon Fibers | 85:10:3:2 |
| 2nd Ex. | 3/7 | Copolymer 1 | AB | Vapor Grown Carbon Fibers | 85:10:3:2 |
| 3rd Ex. | 5/5 | Copolymer 1 | AB | Vapor Grown Carbon Fibers | 85:10:3:2 |
| 4th Ex. | 9/1 | Copolymer 1 | AB | Vapor Grown Carbon Fibers | 85:10:3:2 |
| 5th Ex. | 3/7 | Copolymer 1 | — | Vapor Grown Carbon Fibers | 85:10:0:5 |
| 1st Com. Ex. | 3/7 | PVdF | AB | Vapor Grown Carbon Fibers | 85:10:3:2 |
| 2nd Com. Ex. | 3/7 | CMC | AB | Vapor Grown Carbon Fibers | 85:10:3:2 |
| 3rd Com. Ex. | 3/7 | PVA | AB | Vapor Grown Carbon Fibers | 85:10:3:2 |
| 4th Com. Ex. | 3/7 | PAANa | AB | Vapor Grown Carbon Fibers | 85:10:3:2 |

(Assembly of Cell)

Coin cells (CR2032) were fabricated using the negative electrodes obtained in the first through fifth examples and the first comparative example, a counter electrode made of metallic lithium, a glass filter (Product Name: GA-100, made by Advantech Co., Ltd.) as a separator, and a solution as an electrolytic solution. The solution was formed by dissolving $LiPF_6$, at a concentration of 1 mol/L, in a solvent formed by mixing ethylene carbonate (EC) and diethyl carbonate (DEC) at a volume ratio of 1:1, and adding vinylene carbonate (VC) as an additive for the electrolyte to the resultant material at 1% by mass. The negative electrode mixture of the negative electrode of each of the second, third, and fourth comparative examples was separated from an associated current collector, and a determination was thus made that it was impossible to assemble a cell.

(Cycle Test)

A cycle test was conducted at 30° C. using the coin cells of the first through fifth examples and the first comparative example.

Measurement Conditions: charged at 0.2 C, repetitively discharged

Cutoff Potential: 0-1.0 V (vs. Li$^+$/Li)

Table 2 shows cycle test results. The capacity (mAh/g) of the active material of each negative electrode in this table was measured by a constant-current charge/discharge test.

TABLE 2

| Examples | Active Material Capacity At Predetermined Cycles | | | | |
|---|---|---|---|---|---|
| | 1st Cycle | 2nd Cycle | 5th Cycle | 10th Cycle | 30th Cycle |
| 1st Ex. | 497 | 467 | 375 | 294 | 218 |
| 2nd Ex. | 1060 | 989 | 808 | 631 | 402 |
| 3rd Ex. | 1719 | 1385 | 1000 | 794 | 533 |
| 4th Ex. | 3250 | 2483 | 1255 | 853 | 663 |
| 5th Ex. | 848 | 791 | 646 | 504 | 321 |
| 1st Com. Ex. | 1269 | 280 | 24 | 12 | 5 |

As is clear from Table 2, the retention of the active material capacity of the cell of the first comparative example was reduced to 22% at the second cycle, and was reduced to 1.9% at the fifth cycle (where the active material capacity at the first cycle is 100%). On the other hand, the retention in each of the first through fifth examples was as high as 39-76% at the fifth cycle, and was as high as 20-44% even at the thirtieth cycle. This shows that the cycle characteristics are superior to those in the first comparative example.

In each of the first through fifth examples, only the copolymer of the vinyl alcohol and the alkali metal-neutralized product of ethylene-unsaturated carboxylic acid was used as the binder. However, it has been recognized that even if another water-based binder (e.g., carboxymethylcellulose (CMC), an acrylic resin such as polyacrylic acid, sodium polyacrylate, or polyacrylate, sodium alginate, polyimide (PI), polytetrafluoroethylene (PTFE), polyamide, polyamideimide, styrene-butadiene-rubber (SBR), polyvinyl alcohol (PVA), an ethylene-vinyl acetate copolymer (EVA), or any other suitable material) is added in an amount of 10-80% by mass relative to the total mass of the copolymer of the vinyl alcohol and the alkali metal-neutralized product of ethylene-unsaturated carboxylic acid and the another water-based binder, the cycle characteristics are superior just like the first through fifth examples.

Fabrication of Carbon Negative Electrode

Sixth Example

First, a negative electrode mixture slurry was prepared by mixing 93 parts by mass of graphite (OMAC-R: artificial graphite, made by Osaka Gas Chemicals Co., Ltd.), 4 parts by mass of the copolymer of the vinyl alcohol and the alkali metal-neutralized product of ethylene-unsaturated carboxylic acid (copolymer 1) obtained in the third preparation example, 1.5 parts by mass of acetylene black (AB) (Product Name: Denka Black (registered trademark), made by DENKI KAGAKU KOGYO KABUSIKI KAISHA), 1.5 parts by mass of vapor grown carbon fibers (VGCFs, made by Showa Denko K.K.), and 100 parts by mass of water.

The mixture was applied onto a 40-μm-thick electrolytic copper foil, and was dried. Then, the electrolytic copper foil and the applied film were tightly bonded together by a roll press (manufactured by Oono-Roll Corporation). Next, heating (under a reduced pressure at 140° C. for 12 or more hours) was performed to fabricate a test negative electrode. The capacity density of this test negative electrode was 1.7 mAh/cm$^2$ (Average Thickness of Active Material Layer: 30 μm).

Seventh Example

A negative electrode was fabricated in a manner similar to that in the sixth example, except that 93 parts by mass of amorphous carbon (soft carbon, SC, made by Osaka Gas Chemicals Co., Ltd.) was used instead of 93 parts by mass of graphite in the sixth example. The thickness of an active material layer was 30 μm, and the capacity density of the negative electrode was 1.5 mAh/cm$^2$.

Eighth Example

A negative electrode was fabricated in a manner similar to that in the sixth example, except that 93 parts by mass of amorphous carbon (hard carbon, HC, made by Osaka Gas Chemicals Co., Ltd.) was used instead of 93 parts by mass of graphite in the sixth example. The thickness of an active material layer was 30 μm, and the capacity density of the negative electrode was 1.5 mAh/cm$^2$.

Ninth Example

A negative electrode was fabricated in a manner similar to that in the sixth example, except that 4 parts by mass of the copolymer of the vinyl alcohol and the alkali metal-neutralized product of ethylene-unsaturated carboxylic acid (copolymer 2) obtained in the fourth preparation example was used instead of 4 parts by mass of the copolymer of the vinyl alcohol and the alkali metal-neutralized product of ethylene-unsaturated carboxylic acid (copolymer 1) obtained in the third preparation example and used in the sixth example. The thickness of an active material layer was 30 μm, and the capacity density of the negative electrode was 1.7 mAh/cm$^2$.

Tenth Example

A negative electrode was fabricated in a manner similar to that in the sixth example, except that 3.0 parts by mass of VGCFs were used instead of 1.5 parts by mass of AB and 1.5 parts by mass of VGCFs in the sixth example. The thickness of an active material layer was 30 μm, and the capacity density of the negative electrode was 1.7 mAh/cm$^2$.

Eleventh Example

A negative electrode was fabricated in a manner similar to that in the sixth example, except that 2.85 parts by mass of AB and 0.15 parts by mass of VGCFs were used instead of 1.5 parts by mass of AB and 1.5 parts by mass of VGCFs in the sixth example. The thickness of an active material layer was 30 μm, and the capacity density of the negative electrode was 1.7 mAh/cm$^2$.

Fifth Comparative Example

First, a negative electrode slurry was prepared by mixing 93 parts by mass of graphite, 4 parts by mass of polyvinylidene fluoride (PVdF: Product Name: KF polymer L #1120, made by Kureha Chemical Industry Co., Ltd.), 1.5 parts by mass of acetylene black (AB) (Product Name: Denka Black (registered trademark), made by DENKI KAGAKU KOGYO KABUSIKI KAISHA), 1.5 parts by mass of vapor grown carbon fibers (VGCFs, made by Showa Denko K.K.), and 100 parts by mass of N-methyl pyrrolidone.

The slurry obtained was applied onto a 40-μm-thick electrolytic copper foil, and was dried. Then, the electrolytic copper foil and the applied film were tightly bonded together to fabricate a negative electrode. The thickness of an active material layer was 28 μm, and the capacity density of the negative electrode was 1.5 mAh/cm$^2$.

Sixth Comparative Example

A negative electrode was fabricated in a manner similar to that in the fifth comparative example, except that 93 parts by mass of amorphous carbon (SC, soft carbon) was used instead of 93 parts by mass of graphite in the fifth comparative example. The thickness of an active material layer was 28 μm, and the capacity density of the negative electrode was 1.5 mAh/cm$^2$.

Seventh Comparative Example

A negative electrode was fabricated in a manner similar to that in the fifth comparative example, except that 93 parts by mass of amorphous carbon (HC, hard carbon) was used instead of 93 parts by mass of graphite in the fifth comparative example. The thickness of the active material layer was 28 μm, and the capacity density of the negative electrode was 1.5 mAh/cm$^2$.

Eighth Comparative Example

A negative electrode was fabricated in a manner similar to that in the sixth example, except that carboxymethylcellulose (CMC) was used instead of the copolymer of the vinyl alcohol and the alkali metal-neutralized product of ethylene-unsaturated carboxylic acid (copolymer 1) in the sixth example. A negative electrode mixture of this comparative example had a low binding force to an electrolytic copper foil, and peeled off after being dried.

Ninth Comparative Example

A negative electrode was fabricated in a manner similar to that in the sixth example, except that polyvinyl alcohol (PVA) was used instead of the copolymer of the vinyl alcohol and the alkali metal-neutralized product of ethylene-unsaturated carboxylic acid (copolymer 1) in the sixth example. A negative electrode mixture of this comparative example had a low binding force to an electrolytic copper foil, and peeled off after being dried.

Tenth Comparative Example

A negative electrode was fabricated in a manner similar to that in the sixth example, except that sodium polyacrylate (PAANa) was used instead of the copolymer of the vinyl alcohol and the alkali metal-neutralized product of ethylene-unsaturated carboxylic acid (copolymer 1) in the sixth example. A negative electrode mixture of this comparative example had a low binding force to an electrolytic copper foil, and peeled off after being dried.

Table 3 shows the composition of each negative electrode.

TABLE 3

| | Active Material A | Binder B | Conductive Assistant 1 C | Conductive Assistant 2 D | Mixture Ratio (% by mass) A:B:C:D |
|---|---|---|---|---|---|
| 6th Ex. | Graphite | Copolymer 1 | AB | Vapor Grown Carbon Fibers | 93:4:1.5:1.5 |
| 7th Ex. | SC | Copolymer 1 | AB | Vapor Grown Carbon Fibers | 93:4:1.5:1.5 |
| 8th Ex. | HC | Copolymer 1 | AB | Vapor Grown Carbon Fibers | 93:4:1.5:1.5 |
| 9th Ex. | Graphite | Copolymer 2 | AB | Vapor Grown Carbon Fibers | 93:4:1.5:1.5 |
| 10th Ex. | Graphite | Copolymer 1 | — | Vapor Grown Carbon Fibers | 93:4:0:3 |
| 11th Ex. | Graphite | Copolymer 1 | AB | Vapor Grown Carbon Fibers | 93:4:2.85:0.15 |
| 5th Com. Ex. | Graphite | PVdF | AB | Vapor Grown Carbon Fibers | 93:4:1.5:1.5 |
| 6th Com. Ex. | SC | PVdF | AB | Vapor Grown Carbon Fibers | 93:4:1.5:1.5 |
| 7th Com. Ex. | HC | PVdF | AB | Vapor Grown Carbon Fibers | 93:4:1.5:1.5 |
| 8th Com. Ex. | Graphite | CMC | AB | Vapor Grown Carbon Fibers | 93:4:1.5:1.5 |
| 9th Com. Ex. | Graphite | PVA | AB | Vapor Grown Carbon Fibers | 93:4:1.5:1.5 |
| 10th Com. Ex. | Graphite | PAANa | AB | Vapor Grown Carbon Fibers | 93:4:1.5:1.5 |

Positive Electrode

First Reference Example

First, a positive electrode mixture slurry was prepared by mixing 90 parts by mass of an active material (LiFePO$_4$ made by SUMITOMO OSAKA CEMENT Co., Ltd.), 6 parts by mass of the copolymer of the vinyl alcohol and the alkali metal-neutralized product of ethylene-unsaturated carboxylic acid (copolymer 1) obtained in the third preparation example as a binder, 2 parts by mass of carbon nanotubes (VGCFs made by Showa Denko K.K.) and 2 parts by mass of Ketjen black (ECP-300JD made by Lion Corporation) as conductive assistants, and 400 parts by mass of water.

The mixture was applied onto a 20-μm-thick aluminum foil, and was dried. Then, the aluminum foil and the applied film were tightly bonded together by a roll press (manufactured by Oono-Roll Corporation). Next, heating (under a reduced pressure at 140° C. for 12 or more hours) was performed to fabricate a test positive electrode. The capacity density of this test positive electrode was 1.6 mAh/cm$^2$ (average thickness of active material layer: 50 μm). Note that this positive electrode was used as each of test positive electrodes indicated below.

(Assembly of Cell)

Coin cells (CR2032) were fabricated using the negative electrodes obtained in the sixth through eleventh examples and the fifth through seventh comparative examples, the positive electrode obtained in the first reference example as a counter electrode, a glass filter (Product Name: GA-100, made by Advantech Co., Ltd.) as a separator, and a solution as an electrolytic solution. The solution was formed by dissolving LiPF$_6$, at a concentration of 1 mol/L, in a solvent formed by mixing ethylene carbonate (EC) and diethyl carbonate (DEC) at a volume ratio of 1:1, and adding vinylene carbonate (VC) as an additive for the electrolyte to the resultant material at 1% by mass. The negative electrode mixture of the negative electrode of each of the eighth through tenth comparative examples was separated from an associated current collector, and a determination was thus made that it was impossible to assemble a cell.

(Cycle Test)

A cycle test was conducted at 60° C. using the coin cells of the sixth through eleventh examples and the fifth through seventh comparative examples.

Measurement Conditions: charged at 1 C, repetitively discharged at 1 C

Cutoff Potential: 2-4 V (vs. Li$^+$/Li)

Table 4 shows cycle test results. The capacity retention (%) of each negative electrode in this table was calculated regarding that the capacity thereof at the first cycle is 100.

TABLE 4

| Negative Electrode | Active Material Capacity Retention at Predetermined Cycles (%) | | | | |
|---|---|---|---|---|---|
| | 1st Cycle | 2nd Cycle | 5th Cycle | 10th Cycle | 30th Cycle |
| 6th Ex. | 100 | 99 | 98 | 94 | 92 |
| 7th Ex. | 100 | 99 | 98 | 97 | 95 |
| 8th Ex. | 100 | 99 | 98 | 96 | 94 |
| 9th Ex. | 100 | 99 | 98 | 95 | 93 |
| 10th Ex. | 100 | 89 | 87 | 85 | 85 |
| 11th Ex. | 100 | 99 | 97 | 93 | 90 |
| 5th Com. Ex. | 100 | 95 | 89 | 84 | 17 |
| 6th Com. Ex. | 100 | 97 | 93 | 86 | 30 |
| 7th Com. Ex. | 100 | 96 | 92 | 84 | 26 |

As is clear from Table 4, the retention of the active material capacity of the cell of the fifth comparative example was reduced to 17% at the thirtieth cycle (where the active material capacity at the first cycle is 100%). The retention of the active material capacity of the cell of each of the sixth and seventh comparative examples was also reduced to 30% or less at the thirtieth cycle. On the other hand, the retention in each of the sixth through eleventh examples was as high as 85-95% at the thirtieth cycle. This shows that the cycle characteristics are superior to those in each of the fifth through seventh comparative examples.

In the sixth through eleventh examples, only the copolymer of the vinyl alcohol and the alkali metal-neutralized product of ethylene-unsaturated carboxylic acid was used as the binder. However, it has been recognized that even if another water-based binder (e.g., carboxymethylcellulose (CMC), an acrylic resin such as polyacrylic acid, sodium polyacrylate, or polyacrylate, sodium alginate, polyimide (PI), polytetrafluoroethylene (PTFE), polyamide, polyamideimide, styrene-butadiene-rubber (SBR), polyvinyl alcohol (PVA), an ethylene-vinyl acetate copolymer (EVA), or any other suitable material) is added in an amount of 10-80% by mass relative to the total mass of the copolymer of the vinyl alcohol and the alkali metal-neutralized product of ethylene-unsaturated carboxylic acid and the another water-based binder, the cycle characteristics are superior just like the sixth through eleventh examples.

Fabrication of Si-based Negative Electrode

Twelfth Example

First, a negative electrode mixture slurry was prepared by mixing 80 parts by mass of an active material (Si: 5-10 μm, made by FUKUDA METAL FOIL & POWDER Co., LTD.), 30.35 parts by mass of the copolymer of the vinyl alcohol and the alkali metal-neutralized product of ethylene-unsaturated carboxylic acid (copolymer 1) obtained in the third preparation example, 1 part by mass of acetylene black (AB) (Product Name: Denka Black (registered trademark), made by DENKI KAGAKU KOGYO KABUSIKI KAISHA), 1 part by mass of vapor grown carbon fibers (VGCFs, made by Showa Denko K.K.), and 400 parts by mass of water.

The mixture obtained was applied onto a 40-μm-thick electrolytic copper foil, and was dried. Then, the electrolytic copper foil and the applied film were tightly bonded together by a roll press (manufactured by Oono-Roll Corporation). Next, heating (under a reduced pressure at 140° C. for 12 or more hours) was performed to fabricate a negative electrode. The thickness of an active material layer was 15 μm, and the capacity density of this negative electrode was 3.0 mAh/cm$^2$.

Thirteenth Example

A negative electrode was fabricated in a manner similar to that in the twelfth example, except that 80 parts by mass of SiO (SiO: 5 μm, made by OSAKA Titanium Technologies Co., Ltd.) was used instead of 80 parts by mass of Si in the twelfth example. The thickness of an active material layer was 35 μm, and the capacity density of this negative electrode was 3.0 mAh/cm$^2$.

Fourteenth Example

A negative electrode was fabricated in a manner similar to that in the twelfth example, except that 30.35 parts by mass of the copolymer of the vinyl alcohol and the alkali metal-neutralized product of ethylene-unsaturated carboxylic acid (copolymer 2) obtained in the fourth preparation example was used instead of 30.35 parts by mass of the copolymer of the vinyl alcohol and the alkali metal-neutralized product of ethylene-unsaturated carboxylic acid (copolymer 1) obtained in the third preparation example and used in the twelfth example. The thickness of an active material layer was 15 μm, and the capacity density of this negative electrode was 3.0 mAh/cm².

Fifteenth Example

A negative electrode was fabricated in a manner similar to that in the twelfth example, except that 2 parts by mass of VGCFs were used instead of 1 part by mass of AB and 1 part by mass of VGCFs in the twelfth example. The thickness of an active material layer was 15 μm, and the capacity density of this negative electrode was 3.0 mAh/cm².

Sixteenth Example

A negative electrode was fabricated in a manner similar to that in the twelfth example, except that 1.9 parts by mass of AB and 0.1 parts by mass of VGCFs were used instead of 1 part by mass of AB and 1 part by mass of VGCFs in the twelfth example. The thickness of an active material layer was 15 μm, and the capacity density of this negative electrode was 3.0 mAh/cm².

Eleventh Comparative Example

A negative electrode was fabricated in a manner similar to that in the twelfth example, except that 30.35 parts by mass of polyvinylidene fluoride (PVdF: Product Name: KF polymer L #1120, made by Kureha Chemical Industry Co., Ltd.) was used instead of 30.35 parts by mass of the copolymer of the vinyl alcohol and the alkali metal-neutralized product of ethylene-unsaturated carboxylic acid (copolymer 1) obtained in the third preparation example and used in the twelfth example, and N-methyl pyrrolidone (NMP) was used, as a dispersion medium, instead of water in the twelfth example. The thickness of an active material layer was 15 μm, and the capacity density of this negative electrode was 3.0 mAh/cm².

Twelfth Comparative Example

A negative electrode was fabricated in a manner similar to that in the eleventh comparative example, except that 80 parts by mass of SiO (SiO: 5 μm, made by OSAKA Titanium Technologies Co., Ltd.) was used instead of 80 parts by mass of Si in the eleventh comparative example. The thickness of an active material layer was 35 μm, and the capacity density of this negative electrode was 3.0 mAh/cm².

Thirteenth Comparative Example

A negative electrode was fabricated in a manner similar to that in the twelfth example, except that 15.15 parts by mass of styrene-butadiene-rubber (SBR) and 15.2 parts by mass of carboxymethylcellulose (CMC) (total: 30.35 parts by mass) were used instead of 30.35 parts by mass of the copolymer of the vinyl alcohol and the alkali metal-neutralized product of ethylene-unsaturated carboxylic acid (copolymer 1) in the twelfth example. The thickness of an active material layer was 15 μm, and the capacity density of this negative electrode was 3.0 mAh/cm².

Fourteenth Comparative Example

A negative electrode was fabricated in a manner similar to that in the twelfth comparative example, except that 30.35 parts by mass of polyvinyl alcohol (PVA) was used instead of 30.35 parts by mass of the copolymer of the vinyl alcohol and the alkali metal-neutralized product of ethylene-unsaturated carboxylic acid (copolymer 1) in the twelfth comparative example. A negative electrode mixture of this comparative example had a low binding force to an electrolytic copper foil, and peeled off after being dried.

Fifteenth Comparative Example

A negative electrode was fabricated in a manner similar to that in the twelfth example, except that 30.35 parts by mass of sodium polyacrylate (PAANa) was used instead of 30.35 parts by mass of the copolymer of the vinyl alcohol and the alkali metal-neutralized product of ethylene-unsaturated carboxylic acid (copolymer 1) in the twelfth example. A negative electrode mixture of this comparative example had a low binding force to an electrolytic copper foil, and peeled off after being dried.

Table 5 shows the composition of each negative electrode.

TABLE 5

| | Active Material A | Binder B | Conductive Assistant 1 C | Conductive Assistant 2 D | Mixture Ratio (Part By Mass) A:B:C:D |
|---|---|---|---|---|---|
| 12th Ex. | Si | Copolymer 1 | AB | Vapor Grown Carbon Fibers | 80:30.35:1:1 |
| 13th Ex. | SiO | Copolymer 1 | AB | Vapor Grown Carbon Fibers | 80:30.35:1:1 |
| 14th Ex. | Si | Copolymer 2 | AB | Vapor Grown Carbon Fibers | 80:30.35:1:1 |
| 15th Ex. | Si | Copolymer 1 | — | Vapor Grown Carbon Fibers | 80:30.35:0:2 |
| 16th Ex. | Si | Copolymer 1 | AB | Vapor Grown Carbon Fibers | 80:30.35:1.9:0.1 |
| 11th Com. Ex. | Si | PVdF | AB | Vapor Grown Carbon Fibers | 80:30.35:1:1 |
| 12th Com. Ex. | SiO | PVdF | AB | Vapor Grown Carbon Fibers | 80:30.35:1:1 |
| 13th Com. Ex. | Si | CMC/SBR | AB | Vapor Grown Carbon Fibers | 80:30.35:1:1 |

TABLE 5-continued

|  | Active Material A | Binder B | Conductive Assistant 1 C | Conductive Assistant 2 D | Mixture Ratio (Part By Mass) A:B:C:D |
|---|---|---|---|---|---|
| 14th Com. Ex. | Si | PVA | AB | Vapor Grown Carbon Fibers | 80:30.35:1:1 |
| 15th Com. Ex. | Si | PAANa | AB | Vapor Grown Carbon Fibers | 80:30.35:1:1 |

(Assembly of Cell)

Coin cells (CR2032) were fabricated using the negative electrodes obtained in the twelfth through sixteenth examples and the eleventh through thirteenth comparative examples, a counter electrode made of metallic lithium, a glass filter (Product Name: GA-100, made by Advantech Co., Ltd.) as a separator, and a solution as an electrolytic solution. The solution was formed in such a manner that $LiPF_6$ is dissolved, at a concentration of 1 mol/L, in a solvent formed by mixing ethylene carbonate (EC) and diethyl carbonate (DEC) at a volume ratio of 1:1, and then, vinylene carbonate (VC) as an additive for the electrolyte is added to the resultant material at 1% by mass. The negative electrode mixture of the negative electrode of each of the fourteenth and fifteenth comparative examples was separated from an associated current collector, and a determination was thus made that it was impossible to assemble a cell.

(Cycle Test)

A cycle test was conducted at 30° C. using the coin cells of the twelfth through sixteenth examples and the eleventh through thirteenth comparative examples.

Measurement Conditions: First Through Third Cycles charged at 0.2 C, repetitively discharged Fourth Cycle and Subsequent Cycles charged at 1 C, repetitively discharged Cutoff Potential: 0-1.0 V (vs. $Li^+/Li$)

Capacity Restriction: 1000 mAh/g

Table 6 shows cycle test results. The capacity retention (%) of each negative electrode in this table was calculated regarding that the capacity thereof at the first cycle is 100.

TABLE 6

| Negative Electrode | Active Material Capacity Retention at Predetermined Cycle (%) | | | | |
|---|---|---|---|---|---|
|  | 1st Cycle | 2nd Cycle | 5th Cycle | 50th Cycle | 100th Cycle |
| 12th Ex. | 100 | 100 | 100 | 100 | 100 |
| 13th Ex. | 100 | 99 | 99 | 99 | 97 |
| 14th Ex. | 100 | 99 | 98 | 96 | 93 |
| 15th Ex. | 100 | 100 | 100 | 100 | 100 |
| 16th Ex. | 100 | 99 | 99 | 97 | 94 |
| 11th Com. Ex. | 100 | 82 | 48 | 33 | 29 |
| 12th Com. Ex. | 100 | 80 | 45 | 27 | 23 |
| 13th Com. Ex. | 100 | 89 | 75 | 50 | 48 |

As is clear from Table 6, the retention of the active material capacity of the cell of the eleventh comparative example was reduced to 29% at the hundredth cycle (where the active material capacity at the first cycle was 100%). The retention of the active material capacity of the cell of each of the twelfth and thirteenth comparative examples was also reduced to 50% or less at the hundredth cycle. On the other hand, the retention in each of the twelfth through sixteenth examples was as high as 90% or more at the hundredth cycle. This shows that the cycle characteristics are superior to those in each of the eleventh through thirteenth comparative examples.

In each of the twelfth through fifteenth examples, only the copolymer of the vinyl alcohol and the alkali metal-neutralized product of ethylene-unsaturated carboxylic acid was used as the binder. However, it has been recognized that even if another water-based binder (e.g., carboxymethylcellulose (CMC), an acrylic resin such as polyacrylic acid, sodium polyacrylate, or polyacrylate, sodium alginate, polyimide (PI), polytetrafluoroethylene (PTFE), polyamide, polyamideimide, styrene-butadiene-rubber (SBR), polyvinyl alcohol (PVA), an ethylene-vinyl acetate copolymer (EVA), or any other suitable material) is added in an amount of 10-80% by mass relative to the total mass of the copolymer of the vinyl alcohol and the alkali metal-neutralized product of ethylene-unsaturated carboxylic acid and the another water-based binder, the cycle characteristics are superior just like the twelfth through sixteenth examples.

The present invention provides a negative electrode mixture that is available for use in a negative electrode accompanied by a change in volume, places a low load on the environment, and is operable at high temperature, a negative electrode including an active material continuously having a good binding force, and a secondary cell containing a smaller amount of a binder to provide a high cell capacity. The nonaqueous electrolyte secondary cell according to the present invention is used advantageously as a main power source for a mobile communication device, a portable electronic device, an electric bicycle, an electric motorcycle, an electric vehicle, or any other suitable device.

The invention claimed is:

1. A negative electrode mixture for a nonaqueous electrolyte secondary cell, comprising:
    a negative electrode active material;
    a conductive assistant; and
    a binder containing a random copolymer consisting of two copolymerized components, the two components being vinyl alcohol and an alkali metal-neutralized product of ethylene-unsaturated carboxylic acid,
    wherein the random copolymer of vinyl alcohol and the alkali metal-neutralized product of ethylene-unsaturated carboxylic acid comprises a molar ratio of the vinyl alcohol to the alkali metal-neutralized product of ethylene-unsaturated carboxylic acid of 95/5 to 5/95, and
    wherein the random copolymer of vinyl alcohol and an alkali metal-neutralized product of ethylene-unsaturated carboxylic acid comprises a neutralization degree of 100%.

2. The negative electrode mixture of claim 1, wherein a content of the random copolymer of the vinyl alcohol and the alkali metal-neutralized product of ethylene-unsaturated carboxylic acid in the binder is greater than or equal to 20% by mass and less than or equal to 100% by mass.

3. The negative electrode mixture of claim 2, wherein the content of the random copolymer of the vinyl alcohol and the alkali metal-neutralized product of ethylene-unsaturated carboxylic acid in the binder is greater than or equal to 30% by mass and less than or equal to 100% by mass.

4. The negative electrode mixture of claim 1, wherein a content of the binder relative to the total mass of the negative electrode active material, the conductive assistant, and the binder is greater than or equal to 0.5% by mass and less than or equal to 40% by mass.

5. The negative electrode mixture of claim 1, wherein the alkali metal-neutralized product of ethylene-unsaturated carboxylic acid is an alkali metal-neutralized product of acrylic acid or an alkali metal-neutralized product of methacrylic acid.

6. The negative electrode mixture of claim 1, wherein the negative electrode active material contains at least one selected from the group consisting of silicon, a silicon compound, and a carbon material.

7. The negative electrode mixture of claim 6, wherein the negative electrode active material is a complex of the carbon material and the silicon or the silicon compound.

8. The negative electrode mixture of claim 7, wherein a ratio of the carbon material to the silicon or the silicon compound in the complex of the carbon material and the silicon or the silicon compound is 5/95-95/5 in terms of a mass ratio.

9. The negative electrode mixture of claim 6, wherein the carbon material is amorphous carbon.

10. The negative electrode mixture of claim 9, wherein the amorphous carbon contains soft carbon or hard carbon.

11. The negative electrode mixture of claim 1, wherein the conductive assistant contains a carbon nanofiber or a carbon nanotube.

12. The negative electrode mixture of claim 11, wherein a content of the carbon nanofiber or the carbon nanotube in the conductive assistant is greater than or equal to 5% by mass and less than or equal to 100% by mass.

13. A negative electrode for a nonaqueous electrolyte secondary cell, fabricated using the negative electrode mixture of claim 1.

14. A nonaqueous electrolyte secondary cell, comprising: the negative electrode of claim 13.

15. An electrical device, comprising: the nonaqueous electrolyte secondary cell of claim 14.

16. The negative electrode mixture of claim 2, wherein a content of the binder relative to the total mass of the negative electrode active material, the conductive assistant, and the binder is greater than or equal to 0.5% by mass and less than or equal to 40% by mass.

17. The negative electrode mixture of claim 3, wherein a content of the binder relative to the total mass of the negative electrode active material, the conductive assistant, and the binder is greater than or equal to 0.5% by mass and less than or equal to 40% by mass.

* * * * *